United States Patent [19]

Sherman et al.

[11] Patent Number: 5,186,558
[45] Date of Patent: Feb. 16, 1993

[54] PORTABLE PRINTER WITH RECEPTACLE FOR DATA COMMUNICATION TERMINAL

[75] Inventors: Richard A. Sherman, Toddville; Robert B. Jaeger, Swisher; Patrick H. Davis, Cedar Rapids, all of Iowa

[73] Assignee: Norand Corporation, Cedar Rapids, Iowa

[21] Appl. No.: 616,857

[22] Filed: Nov. 21, 1990

[51] Int. Cl.$^5$ .............................................. B41J 29/02
[52] U.S. Cl. ...................... 400/692; 400/88; 400/691; 242/118.4; 242/76
[58] Field of Search .................. 400/88, 691, 692, 613; 242/118.4, 76

[56] References Cited

U.S. PATENT DOCUMENTS

| | | | |
|---|---|---|---|
| 3,349,883 | 10/1967 | Pedersen | 400/613 X |
| 4,054,330 | 10/1977 | Luo | 400/354 X |
| 4,253,774 | 3/1981 | Hanakata et al. | 400/87 |
| 4,549,825 | 10/1985 | Fish, III et al. | 400/692 |
| 4,732,502 | 3/1988 | Yokoi | 400/693 |
| 4,734,710 | 3/1988 | Sato et al. | 400/692 X |
| 4,830,522 | 5/1989 | Sato | 400/120 |
| 4,837,590 | 6/1989 | Sprague | 346/145 |
| 4,849,815 | 7/1989 | Streck | 379/100 |
| 4,881,839 | 11/1989 | Grimm | 400/692 |
| 4,962,430 | 10/1990 | Hiroki | 358/296 |
| 4,976,559 | 12/1990 | Inagaki | 400/691 |
| 5,006,002 | 4/1991 | Brodbeck | 400/613.2 |
| 5,032,030 | 7/1991 | Russbült | 400/88 |

FOREIGN PATENT DOCUMENTS

| | | | |
|---|---|---|---|
| 258792 | 3/1988 | European Pat. Off. | 400/88 |
| 3705950 | 9/1988 | Fed. Rep. of Germany | 400/88 |
| 75881 | 5/1982 | Japan | 400/88 |
| 152980 | 9/1982 | Japan | 400/613 |
| 128886 | 8/1983 | Japan | 400/613 |
| 38822 | 3/1984 | Japan | 400/88 |
| 229777 | 11/1985 | Japan | 400/88 |
| 254371 | 11/1986 | Japan | 400/88 |
| 32070 | 2/1987 | Japan | 400/88 |
| 2158013 | 11/1985 | United Kingdom | 400/88 |

OTHER PUBLICATIONS

IBM Technical Disclosure Bulletin, vol. 28, No. 1, Jun. 1985.

*Primary Examiner*—Edgar S. Burr
*Assistant Examiner*—Eric P. Raciti
*Attorney, Agent, or Firm*—McAndrews, Held & Malloy, Ltd.

[57] ABSTRACT

A portable printer has a housing of impact resistant plastic material. The housing forms a printer cavity and a terminal cavity. A handle is integrally formed as part of the printer housing. Edges of housing elements forming the printer cavity are substantially sealed against each other to protect a printer mechanism, a paper supply, a battery and printer electronics within the printer cavity from water or other contaminants. The terminal cavity housing forms a receptacle for receiving a portable data entry terminal. A circuit board along an edge common to both the printer cavity and the terminal cavity of the housing carries a spring contact connector having a predetermined number of contact springs to engage a corresponding number of contact pads of such a portable data entry terminal when inserted into the receptacle. The circuit board further includes a seal in the region of the wall between the terminal cavity and the printer cavity to maintain the substantially sealed character of the printer cavity. The circuit board further is the mounting board for printer logic functions and for power and data connections to print support elements, to an optional modem and to the printer mechanism. A voltage regulator of unregulated 12 volt power from a vehicle power source includes a switching regulator element which is controlled over a first voltage range. Above the first range printing is blocked and the voltage may then follow the input voltage. A second regulation level may be provided above the first level to protect a low voltage power supply for logic and communications components.

6 Claims, 6 Drawing Sheets

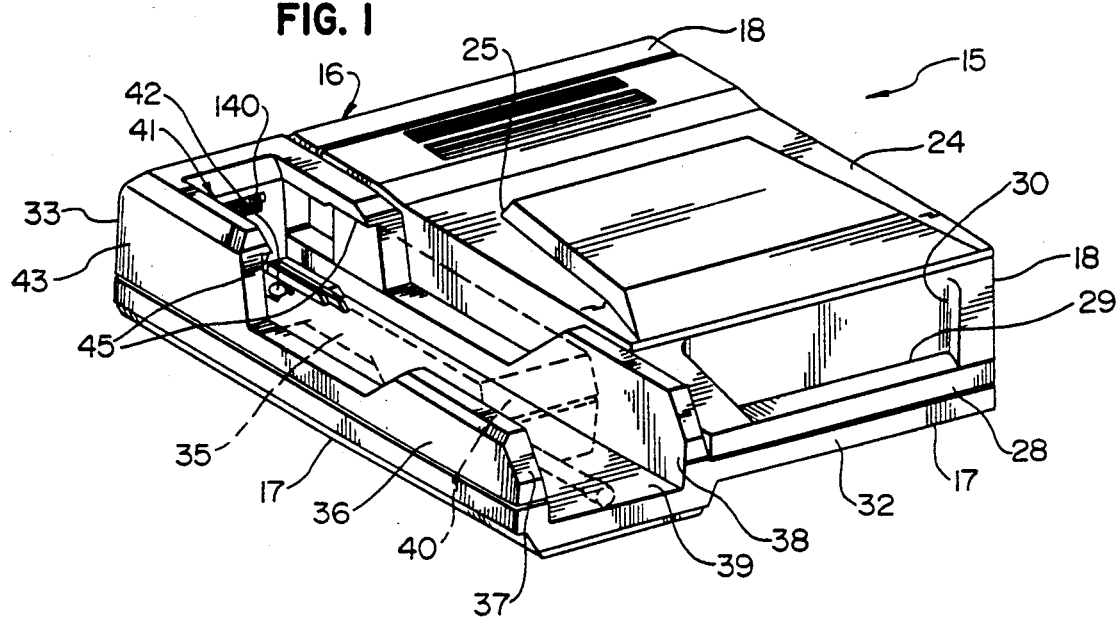
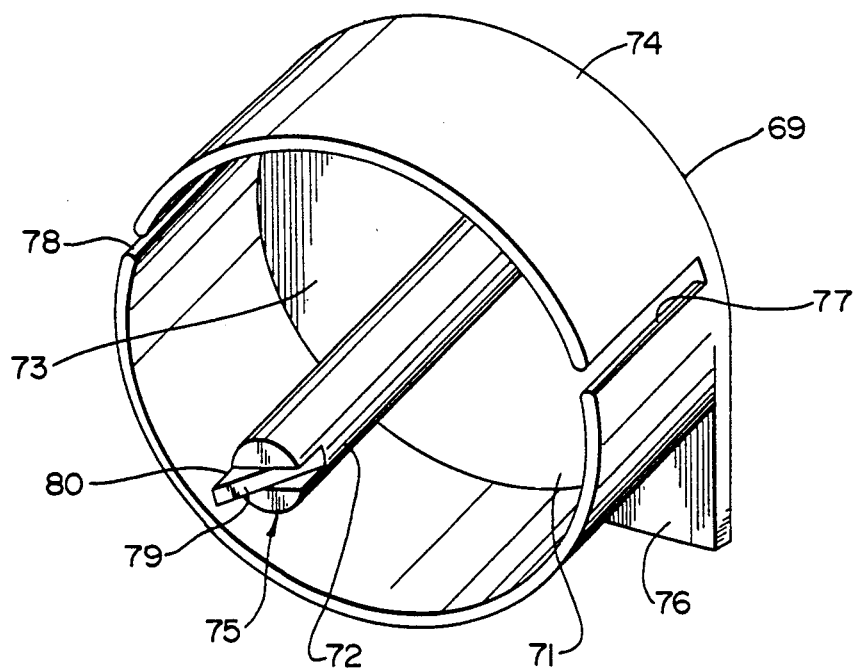

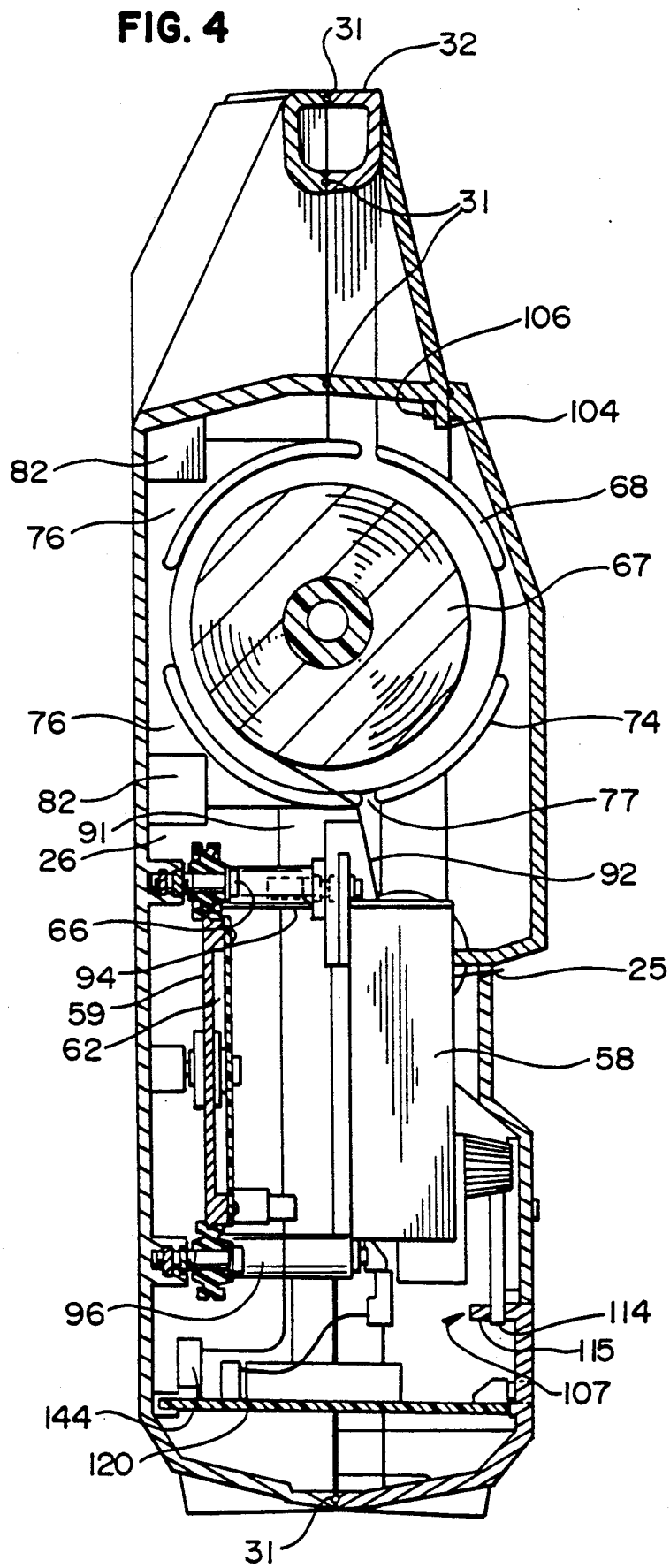

PORTABLE PRINTER WITH RECEPTACLE FOR DATA COMMUNICATION TERMINAL

BACKGROUND OF THE INVENTION

1. Field of the Invention

The invention relates generally to printers and particularly to portable printers.

2. Discussion of the Art

Many types and models of office printers are currently available to serve diverse office printing needs. Small printer mechanisms have been developed and are commercially available as OEM components to be coupled to calculators or to be incorporated into various types of equipment including office equipment and point of sale units. Printers also have become available for portable use in conjunction with portable computers. A printer unit may be stored in a case together with a computer. The case may be ported to a convenient user location at which the case may be opened and the computer and the printer may be used in conjunction with each other. However, the known printers typically fail to afford the printer mechanism sufficient protection to allow the printer to be used in a mobile working environment which may expose the printer to various environmental hazards. Typical office use of printers does not expose them to the hazards of outdoors use and contaminants which are known to be damaging to the mechanism. Such harmful contaminants may include, for example, moisture in the form of rain, or dirt or dust from inherently dusty environments.

A potentially damaging amount of dust even may be found at some manufacturing locations or in a warehouse. But more generally, printers would most likely be exposed to hazards at various outdoor locations, such as construction sites or simply during a sudden rain shower while a printer is being carried between two order taking locations, for example.

3. Related Developments

A copending application for patent by George E. Chadima, Jr. et al., entitled MODULAR PRINTER SYSTEM, filed on . . . and assigned to the assignee of this invention, relates to a printer module and a terminal module which are combined in a modular printer device. In a particular aspect of a development related to the above copending application, an open frame provides for mounting modules, such as the printer module and the terminal module. The modular printer system may be hand-carried by a handle attached to the frame, or it may be vehicle-mounted and powered by the vehicle, such as in a delivery route or in a warehousing operation. The above development provides substantial improvements in protecting the printer against the above mentioned environmental hazards. Nevertheless, for pre-sale, order taking operations a need is seen in spite of current developments to provide printers with improved compactness and ruggedness, without sacrifice of features protecting the printers from environmental hazards, and with further weight reduction. Attempts to bring about a higher degree of compactness typically are found to result in a lesser degree of ruggedness of the printers.

SUMMARY OF THE INVENTION

It is a basic objective of this invention to provide an improved printer which is compact in structure, readily ported, and which is substantially protected against damage from environmental hazards or contaminants.

It is a particular object to provide a portable, lightweight and rugged printer which is capable of receiving data from a portable data entry terminal.

It is another particular object of the invention to provide a printer in a readily ported printer case and to provide the printer with a data entry terminal socket for readily coupling such a terminal to the printer.

It is yet another object of the invention to provide a portable printer which is protected against excessive shock due to rough handling or dropping the printer.

It is a further object of the invention to provide a portable printer which is readily assembled.

It is still another object of the invention to provide a housing for a printer which is compact, has an integrated handle and which substantially seals out damaging contaminants to protect the printer.

It is another object of the invention to provide a paper holder of simple structure for holding a roll of paper.

An advantageous embodiment of the invention includes a housing which has among other features a substantially sealed printer cavity, a data entry terminal cavity and an integrally molded handle which is disposed within the outer confines of the housing. A printer module, a paper holder assembly and a self-contained power source are disposed in the printer cavity. A portion of the housing which closes the printer cavity contains a single slotted opening for paper egress.

According to a particular embodiment incorporating features of the invention, a printer housing may be structured of a base shell, having a base, peripherally raised walls and a central partition. On one side of the central partition, the raised peripheral walls and the central partition form a first base cavity for receiving a printer module. On the other side of the central partition, the raised walls form a base cavity for receiving a data entry terminal device. An upper printer housing shell is mounted above said first base cavity. The upper printer housing shell is substantially sealed against the base shell and has peripheral walls which extend the walls of the first base cavity. The upper printer housing shell has a top shell including an opening which provides access for the insertion and removal of components from the printer cavity.

In particular, components which may selectively be removed, such as for repair or replacement, include a printer module, a battery pack, a paper holder, a printer ribbon and a modem. A top cover is removably mounted across the access opening. The top cover has a single slotted opening for paper egress. The top cover and the periphery of the access opening sealingly engage, such that the printer cavity is substantially protected against environmental contaminants from entering the printer cavity to present a hazard to the operation of the printer.

According to a particular aspect of the invention, electrical and data communication may be routed between the data entry terminal cavity and the printer cavity of the printer housing via a circuit board that extends substantially along one wall of the housing between the two cavities. An opening in the upper printer shell may be shaped to receive the board to allow it to extend between the two cavities. Seals may be used to close remaining spaces between the periphery of the opening and the circuit board to preserve a protective closure of the printer cavity of the housing.

According to yet another particular aspect of the invention, a circuit board extending between a printer cavity and a data entry terminal cavity of a printer housing would support a connector comprising a plurality of resilient contacts. The contacts would be spaced and disposed to engage complementary terminal contacts of a data entry terminal device inserted into the data entry terminal cavity of the housing. The data entry terminal cavity includes an upper receptacle shell mounted to the base shell of the housing to provide a seat for such a data entry terminal device. An inserted data entry terminal device becomes electrically and communicatively coupled, via the resilient contacts connector, to the printer module. A locating element on the circuit board engages the housing and references the resilient contacts on the circuit board to the receptacle shell of the housing. A resulting alignment of the circuit board to the housing provides for proper alignment of the inserted data entry terminal device with the resilient contacts connector.

BRIEF DESCRIPTION OF THE DRAWINGS

The detailed description of a preferred embodiment of the invention may be best understood when read in reference to the accompanying drawings wherein:

FIG. 1 shows a general pictorial representation of a compact and light-weight portable printer device as a preferred embodiment of the present invention and illustrates several particular features of the invention;

FIG. 3 is a more detailed representation of the paper holder assembly shown in FIG. 2;

FIG. 4 is a sectional view of the printer module taken at "4—4" and showing the location of the printer module within the housing;

DETAILED DESCRIPTION OF THE INVENTION

Figure 2:
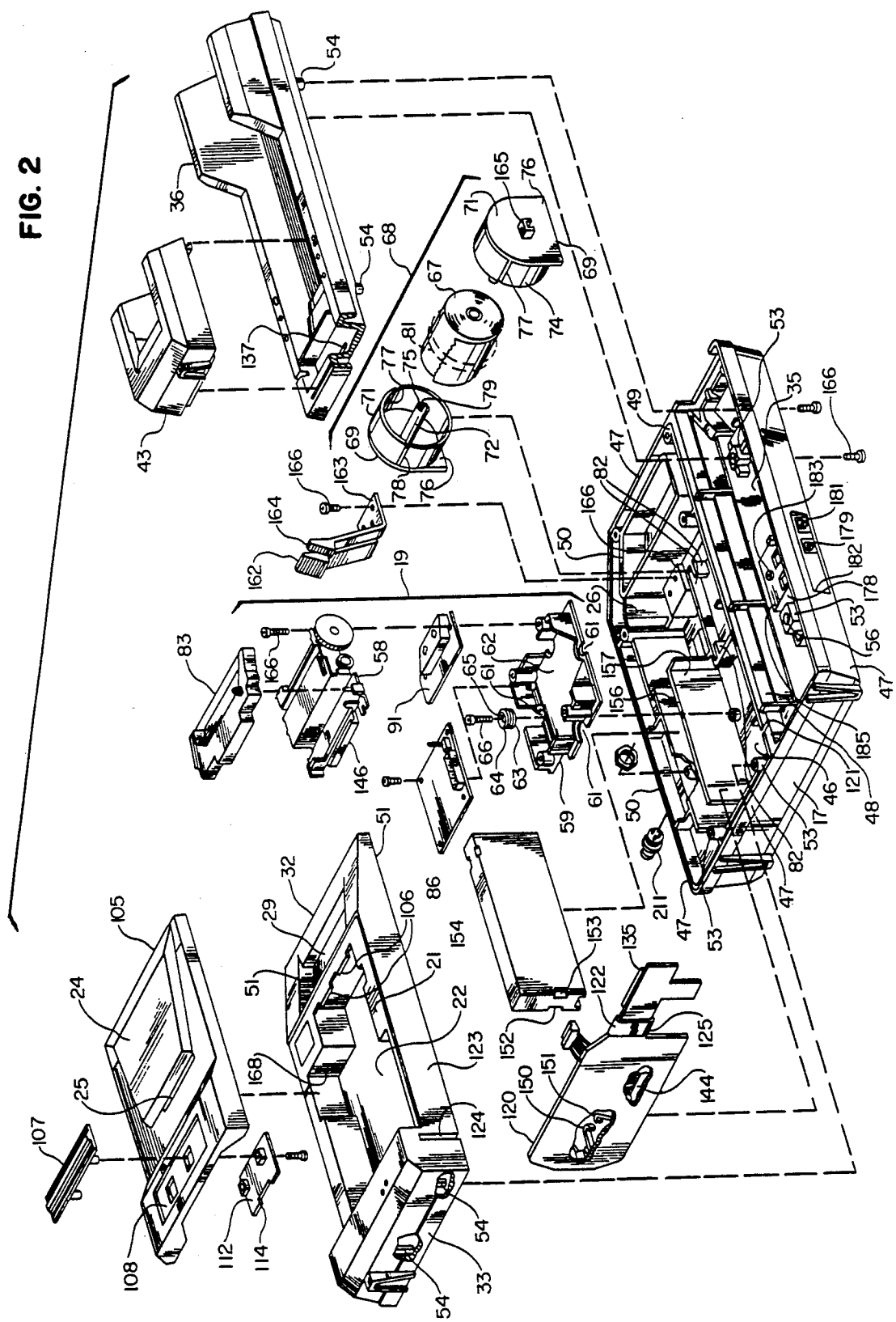
FIG. 2 is a simplified exploded representation of the portable printer, showing major components in relation to each other and highlighting various features of the invention.

Referring to FIG. 1, there is shown a pictorial view of a portable printer assembly designated generally by the numeral 15. A housing 16 of the printer assembly or printer 15 is of molded, high impact plastic type material and is made up of a number of molded elements which are assembled into a unitary structure. Referring to the particular elements, a base shell 17 of the housing 16 is the largest one of the housing elements and its lateral edges define the overall lateral dimensions of the printer 15. The base shell 17 is interiorly sculptured with various mounting bosses and other molded protrusions intended for attachment or location of various elements of the printer 15. An upper printer housing shell 18 is attached to that part of the base shell 17 within which a printer module 19 (See FIG. 2) is to be mounted. The upper printer housing shell 18 features in a top shell or top portion 21 thereof, as can be seen best in FIG. 2, an opening 22 which is of sufficient size to provide access to the printer module 19 and to various associated components.

Again in reference to FIG. 1, the opening 22 is closed off and substantially sealed by a top cover 24. The description of "substantially sealed" refers to the result of effort within the scope of the invention to protect the interior of the printer housing 16 from hazardous contamination from the environment. The top cover 24 when assembled to the upper housing shell 18 fully covers the opening 22 and closes off the opening 22, protecting the components within the housing 16. The substantial seal is intended to protect the printer module 19 from water and dust. However the seal is not a hermetic seal. For example, a paper egress slot 25 is disposed in the top cover 24, such that printed paper may be made accessible to a person while the printer 15 is being operated. By its nature, the paper slot 25 is not readily sealed, though minimized in size and otherwise protected as may become more apparent from other references to the respective elements herein. Thus, the housing elements including the upper printer housing shell 18 and the top cover 24 define in conjunction with the base shell 17 a water and dust resistant, closed off printer cavity 26, as best shown as an open cavity in FIG. 2, in that the cavity is fully enclosed by the housing 16 as shown in FIG. 1.

In FIG. 1, the housing 16 is shown in a flat operating position. When operating the printer 15 as shown, an operator would be located to the left and behind the printer 15, as depicted. The housing elements described so far have been referenced as base, lower or upper with respect to the flat operating position of the printer 15 shown in FIG. 1. The housing 16 shows in addition an integrally molded handle 28 which is formed by a molded handle aperture 29 extending through both the base shell 17 and the upper printer housing shell 18. Peripheral edges 30 of the respective handle aperture 29 in both the base shell 17 and the upper printer housing shell 18 closely match and may preferably be provided with a peripheral seal 31, as shown in FIG. 4. The seal 31, such as a rubber insert, preferably may be provided in furtherance of a general objective of protecting the printer within the substantially sealed housing. Other ways of sealing are known, such as, for example, complementarily grooved and ridged matching wall edges, and may be chosen instead of the seal 31. The seal 31 may also be a gasket which is "formed in place", as may be performed in a robotic assembly operation in accordance with state-of-the-art processes. The described two-sided molded configuration of the handle 28 also allows the handle 28 to be fully sculptured for a comfortable hand grip contour. When the printer 15 is carried by its handle 28, the handle will be disposed at an upper carry end 32 of the housing, the opposite end of the housing 16 being a pedestal end 33 of the housing. Feet 34 may be molded into the respective housing shells at the pedestal end 33. In the carry position of the printer assembly 15, it may be desirable to further protect the paper slot 25 from water. Consequently, a water diverting ridge may be molded into the cover 24 adjacent and just above the slot 25 when the printer assembly 15 is in its upright carrying position.

A data entry terminal device cavity 35, referred to herein simply as terminal cavity 35, is disposed adjacent the printer cavity 26 of the housing 16. A general boundary of the terminal cavity 35 is formed in, and defined by, the base shell 17. A preferred terminal holder 36 is formed effectively of a simple, two-piece molded structure. The terminal holder 36 forms an open terminal guide, having upper lateral guide walls 37 and 38 extending from adjacent the upper carry end 32 of the printer 15 toward its pedestal end 33. The guide walls 37 and 38 define a terminal insertion channel 39. A data entry terminal device 40, shown in phantom lines in FIG. 1, may be inserted from the carry end 32 into electrically coupled engagement with the printer assembly 15 via a terminal receptacle 41 disposed at the pedestal end 33 of the terminal holder 36. At the carry end 32 of the housing 16 the channel 39 is unrestricted and open. At the opposite, pedestal end 33 of the channel 39 the inserted end of the terminal device 40 is retained in the receptacle 41 by a resiliently yielding locating protrusion 42 disposed in the terminal insertion channel 39. The protrusion 42 engages a complementary indentation (not shown) in the terminal device 40. The terminal device 40 is retained within the receptacle 41 by the resilient action of the protrusion urging the terminal device 40 against a terminal holder cap 43. The terminal holder cap 43 is the second structural element of the terminal holder 36. Guide walls of the terminal holder cap 43 include upper retainer ledges 45, the ledges 45 forming against the channel a pocket within which the inserted end of the terminal device may be retained by the resilient protrusion 42. The described terminal holder 36 is preferred over other types of terminal holders because of the ease with which the terminal device 40 may be inserted and the effective manner of retaining the inserted terminal device 40 in the holder 36, even while the printer assembly 15 may be carried about. The structure and function of the terminal holder 36 is described in detail in a copending application for patent of Patrick H. Davis, filed Jul. 10, 1990, a continuation application of application, Ser. No. 07/327,660, filed Mar. 23, 1989, and assigned to the assignee of this application.

Various details of the described printer 15, and various details of the housing 16 may be made reference to in the exploded view of the printer and housing in FIG. 2. The base shell 17 of the housing is a single molded element having a base 46 from which extend upward sloping peripheral wall portions 47 and a partition wall 48. The partition wall 48 divides the base shell 17 and defines a boundary between the printer cavity 26 and the terminal cavity 35. In the preferred embodiment, the peripheral walls 47 and the partition wall 48 extend to and have an upper edge disposed in a common plane and mounting surface 49, except for a preferred depression in the region of the channel 39. Recesses or grooves 50 may preferably be provided adjacent closed edge configurations in the mounting surface 49 defined by the printer cavity 26 and the handle aperture 29.

The periphery of the upper printer housing shell 18 including the periphery of the handle opening 29 preferably includes matching seating surfaces 51 to fit tightly against the mounting surface 49. The printer housing includes matching supports in the respective upper printer housing shell 18 and the base shell 17. The supports, such as bosses 53 and 54 extend from the respective shells towards and into engagement with each other to brace the housing shells against each other and increase the impact strength of the housing. One of each set of bosses 53 and 54 preferably may feature a peripheral locating ridge 56 forming a socket about the top of the boss which fits tightly about the periphery of the opposite boss. The printer module 19 includes a printer mechanism 58, such as a dot matrix impact printer or thermal printer, commercially available from any of a number of printer vendors, such as Epson Corporation, for example. In that it may be desirable to protect the printer mechanism 58 from possible damage by a sharp blow or shock, such as by impact resulting from an accidental drop of the printer assembly, a shock absorbing mounting for the printer module 19 is contemplated. The printer module 19 includes, consequently, a chassis 59. A number of open edge slots or recesses 61 in a base 62 of the chassis 59 form semicircular mounting seats 61 for engaging resilient mounting flanges 63 of commercially available shock absorbers 64, such as Lord shock mounts. Central mounting tubes 65 through the shock absorbers 64 allow the shock absorbers to be mounted with typical fasteners, such as screws 66, to the base shell 17.

The dimensions of the housing 16 are desirably kept to a minimum in providing a compact and slim design. One of the factors determining the profile or height of the printer cavity 26 is the diameter of a standard size roll of printer paper 67. In seeking to protect the paper from the elements, the roll of printer paper is disposed entirely within the housing 16. However, to maintain a low profile of the housing 16, a structure for holding the roll of paper 67 may only minimally exceed the diameter of a full roll of the paper.

FIG. 3 illustrates in greater detail a simple and effective paper holder element. The paper holder is also shown in the exploded view of FIG. 2 and is designated there generally by numeral 68. As can be seen in FIG. 2, the paper holder 68 is comprised of two paper supports 69 which are identical in shape, and one of which is rotated with respect to the other in a plane parallel to a mounting plane through an angle of 180 degrees. Each support 69, also in reference to FIG. 3, is in the shape of a cup. The paper support 69 is preferably molded of a high impact plastic material, as are the housing elements. While the paper support 69 could be formed of other materials, such as cast aluminum, for example, the molded plastic material is preferred. A circular end wall 71 serves as an end guide for the roll of paper 67. A support shaft 72 extends from an inner surface 73 of the end wall 71. A cylindrical shroud 74 is concentrically disposed about at least a portion of the support shaft 72, the shroud extending in essence from the periphery of the circular end wall 71 and giving the support the cup-shaped appearance. The plane of rotation of one of the supports with respect to the other coincides with a central axis through the support shaft 72, such that the correct orientation of the supports with respect to each other coaxially aligns the two shafts, and respective ends 75 of the two shafts face each other. Two substantially triangular mounting feet 76 extend coplanarly from the circular end wall 71, reshaping one semi-circular portion thereof into a rectangular shape, such that one half of the circular end wall in essence appears as one half of a square. In reference to FIG. 3, the two substantially triangular mounting feet 76 are extensions in the plane of the end wall 71 and are disposed about the periphery of the end wall spaced at a right angle about the periphery of the end wall 71. In an alternate embodiment the mounting feet 76 might be shifted, however, out of the plane of the end wall 71 and be attached to and extend from the shroud 74. Or the mounting feet 76 might be configured differently from those described. The current embodiment is preferred because of simplification in the structure of a mold for the paper support 69. A paper slot 77 needs to be provided in the shroud for routing the paper from a roll through the shroud 74 towards the printer module 19. Because of the two supports 69 preferably being identical, a second paper slot 78 is disposed in the shroud 74 at a mirror image position with respect to a plane perpendicular to the plane of rotation of one of the supports 69 with respect to the other. Thus when one of the supports 69 is rotated with respect to the other and the support shafts 72 are aligned, the slots 77 and 78 are coextensively aligned with each other.

Also, the end 75 of the support shaft 72 is provided with a key 79. The key 79 for locking the ends 75 of the support shafts 72 is formed as a protrusion 80 from the end 75 of the support shaft 72 on one side of the referred to mirror image plane and as a complementary recess on the other side thereof. The features of the key 79 are symmetrical with respect to the plane of rotation through the axis of the shaft 72. The axial length of the shroud 74 is preferably less than the length of the support shaft 72. Thus, when the ends 75 of the support shafts 72 of two facing supports 69 become locked, a peripheral gap 81 remains between the respectively adjacent shrouds 74. The gap 81 is shown in FIG. 2 between the ends of the shrouds 74 shown in a close position in phantom lines. The gap 81 permits the roll of paper to be manually rotated to draw paper through the aligned slots 77 and 78 and feed paper to the printer mechanism 58. With the mounting feet 76 set in respective slots between molded guide ridges 82, the paper holder 68 rests against the inner surface of the base shell 17.

FIG. 4 is a sectional view through the printer assembly 15 showing in particular the location of the printer module 19 within the printer cavity 26, the printer mechanism 58 being mounted to the top of the chassis 59 to be disposed adjacent the cover 24. Upon removal of the cover 24, the printer mechanism 58, a printer ribbon cartridge 83, and the paper 67 become readily accessible. The shock absorbers 64 are mounted to bosses 85 of the base shell 17. The flanges 63 of the shock absorbers 64 in turn engage the semicircular mounting seats 61 and hold the chassis 59 in a vibration and shock isolated position above the base 46 of the base shell 17. At a first level above the base 62 of the chassis 59 a circuit board 86 is mounted to mounting bosses. The circuit board 86 may be a functional modem. Such a modem board 86 is preferably chosen to be one of a number of commercially available modem boards which, of course, would be of a size suitable to fit into the space above the base 62 of the chassis 59 and the printer mechanism 58. Providing the portable printer assembly 15 in this manner with a modem, permits data to be selectively communicated from the data entry terminal device 40 to either the printer mechanism 58 for printing or to the modem 86 for transmission via a data link, not shown. In the alternative, the modem 86 may be linked between a data transmission line and the data entry terminal device 40, and the printer mechanism 58 might be enabled to print out instructions or data received over such data transmission line or link.

As shown in FIG. 4, the printer mechanism 58 is preferably disposed as closely as possible adjacent the underside of the cover 24. The resulting high position of the printer mechanism 58 shortens a paper path 88 from the printer mechanism 58 through the paper slot 25 to the outside of the housing 16, making the printed copy accessible to an operator with desirably little waste of paper. A paper infeed guide 91 is mounted between the chassis 59 and the printer mechanism 58 adjacent the paper holder 68. The paper infeed guide or paper guide 91 has a guide surface 92 against which the paper 67 may be placed. The guide surface 92 is coplanar with the paper path into the printer mechanism 58. To accommodate the thickness of mounting feet of the paper guide 91, the height of mounting bosses 94 is appropriately foreshortened with respect to mounting bosses 96 which support the opposite end of the printer mechanism 58 with respect to the chassis 59. When the paper exits from the printer mechanism 58, the mechanism's position next to the cover 24 aligns the paper with a paper exit guide 98 formed in the underside 99 of the cover 24. Sloping surfaces of the guide 98 guide the paper 67 to feed through the slot 25 as the cover 24 is placed onto the upper printer housing shell 18 after feeding the end of such paper 67 through the printer mechanism 58. At an uppermost end of the guide 98, the taper terminates with a serrated edge at the slot 25, as also illustrated in the exploded view in FIG. 2.

Further in reference to FIGS. 2 and 4, the cover 24 is latched to the upper printer housing shell 18 by having latching extensions 104 on a carry end edge 105 of the cover 24. As the cover 24 is replaced, latching extensions 104 are hooked under corresponding lips or catches 106 disposed along the inner periphery of the opening 22 in the upper printer housing shell is. The opposite end of cover 24 disposed toward the pedestal end 33 of the housing 16 features in a preferred embodiment a two-piece slide latch 107. The latch 107 may be disposed on the outside of the cover in an elongated recess 108 as shown with respect to the preferred embodiment. An upper latch actuator slide is disposed for laterally sliding movement within the recess 108. Apertures through in the cover 24 receive latch support posts 111, and a latch plate 112 is mounted to the underside of the cover 24. A front edge 114 of the latch plate 112 is contoured to engage, upon lateral movement along the length of the recess 108, a lock extension 115 disposed at the periphery of the opening 22 adjacent the pedestal end 33 of the housing 16.

Figure 5:
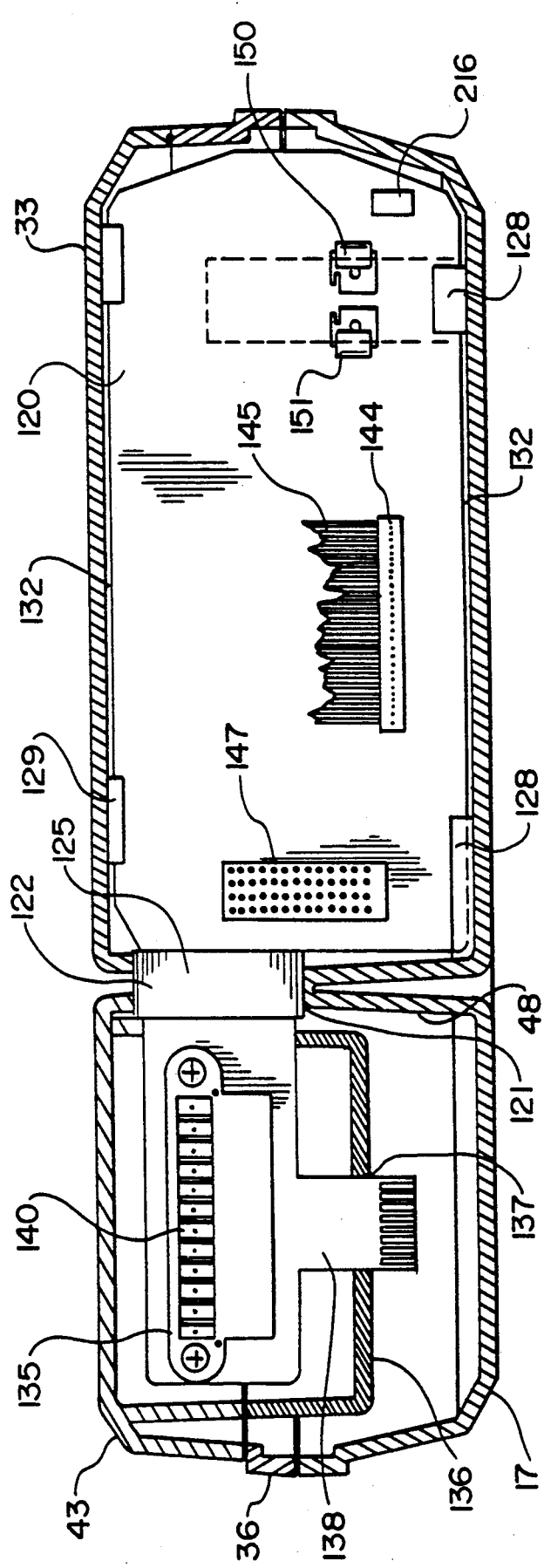
FIG. 5 is a simplified representation of the circuit board showing various elements and functions implemented by the circuit board.

In reference to FIG. 5, and further in reference to FIGS. 2 and 4, a circuit board 120 is mounted within the base shell 17 adjacent and along the pedestal end 33 of the housing 16. A physical length of the circuit board 120 is such that it extends within the housing substantially the entire length of the base shell adjacent the pedestal end 33. The circuit board 120 consequently extends from the non-sealed terminal cavity 35 to the substantially sealed printer cavity 26. The circuit board 120 functions as major conduit for electrical and data communication functions between the printer cavity 26 and the terminal cavity 35.

The circuit board 120 deviates from a rectangular shape of a typical circuit board. When the board 120 is placed into the base shell 17, a necked-down section or width of the board 120 coincides generally with a vertical plane of the partition wall 48. A recess 121 into the partition wall 48 locates the circuit board 120 within the base shell 17 with respect to the partition wall 48. In the plane of the partition wall 48, the circuit board 120 is wrapped with a seal 122. Within a matching side wall 123 of the upper printer housing shell 18, a recess 124 of extended depth receives the seal-wrapped section 125 of the circuit board 120. Lower and upper locating lugs 128 and 129 in respectively the base housing shell 17 and the upper printer housing shell 18 are preferably disposed alternately to either side of the mounting plane of the circuit board 120 within the printer cavity 26 and are spaced from each other with respect to such mounting plane by the thickness of the circuit board 120. The staggered spacing the locating lugs 128 and 129 allows the board 120 to become located tightly in the established space. Any yield in the circuit board 120 between the offset lugs accommodates slight dimensional tolerances of the circuit board. A resilient, shock absorbing buffer strip 132, which may be of polyurethane foam, may be placed as vibration and shock absorbing means against both the top and the bottom edge of the circuit board 120 between the respective edges of the circuit board and the upper printer housing shell 18 and the base shell 17. In a preferred embodiment, the strips 132 may be adhesively coated and may be attached to the respective housing surfaces in the mounting plane of the circuit board 120.

Further in reference to FIG. 5, the circuit board 120 supports as part of the receptacle 41 an electrical and data communication connector 135 disposed in the terminal cavity 35 to communicatively connect to the data entry terminal device 40, when such terminal 40 is placed into the terminal holder 36 as shown in FIG. 1. A base surface 136 of the terminal insertion channel 39 includes adjacent the pedestal end 33 of the housing 16 a locating slot 137 A downward extension 138 of the circuit board 120 is of a size to guidedly slide into the locating slot 137. The connector 135 is laterally aligned with respect to the downward extension 138 when the connector 135 first becomes mounted or attached to the circuit board 120. Consequently, when the downward extension 138 becomes located with respect to the locating slot 137 during the assembly of the circuit board 120 into the housing 16, the connector 135 is positioned with respect to corresponding contact surfaces on a lower edge of the data entry terminal device 40.

The electrical and data communication connector 135 comprises a plurality of contact springs 140 which extend through an end wall 141 of the terminal holder cap 43, as shown in FIG. 1. In a preferred embodiment, there may be, for example, twelve contact springs 140 which would engage a corresponding number of the contact surfaces of the data entry terminal device 40. With respect to FIG. 5, the contact springs 140 are electrically coupled via typical printed circuit conductors to a corresponding electrical and data communication connector 144. A cable 145 which may conveniently be a flat or ribbon cable, is readily routed from the connector 144 to a coupling connection 146 on the printer mechanism 58. A second connector 147 may be used for coupling data communication and power to the modem 86.

Facing power contacts 150 and 151 are attached at one end thereof to the board 120 and are spaced from each other to extend from the board into clamping engagement with corresponding positive and negative power terminals 152 and 153 on opposite major surfaces and adjacent an insertion end of a rectangular shaped battery 154, as shown in FIG. 2. The battery 154 may preferably be a typical VCR camera and recorder battery. A normal space between the contact elements 150 and 151 is such that the contact elements 150 and 151 become resiliently deflected away from each other when the battery is inserted between them. The contact elements 150 and 151 are arranged on the circuit board 120 to be in alignment with the battery 154, when the battery 154 is inserted into the base housing shell 17 between two guide walls 156 and 157, as shown in FIG. 2. In that the power terminals of the battery 154 are disposed near the center of the leading insertion end of the battery, it is significant to prevent an inadvertent reverse contact by the power terminals with the contact elements 150 and 151. The battery 154 includes a marker recess 158 at a lower edge of the leading end of the battery. When the battery is slid into a pocket of essentially the same cross section as the cross section of the battery, the marker recess is intended to match with a key-like protrusion within such pocket. Because the battery 154 is preferably placed downwards into the housing 16, instead of being inserted endwise into a closely fitting pocket of a VCR camera, the battery 154 needs is inserted from the top of the housing 16 through the opening 22 into the printer cavity 26. A special feature for blocking an accidental reversal of the terminals when inserting a battery 154 ma be best explained in reference to FIGS. 2 and 6 of the drawings.

Figure 6:
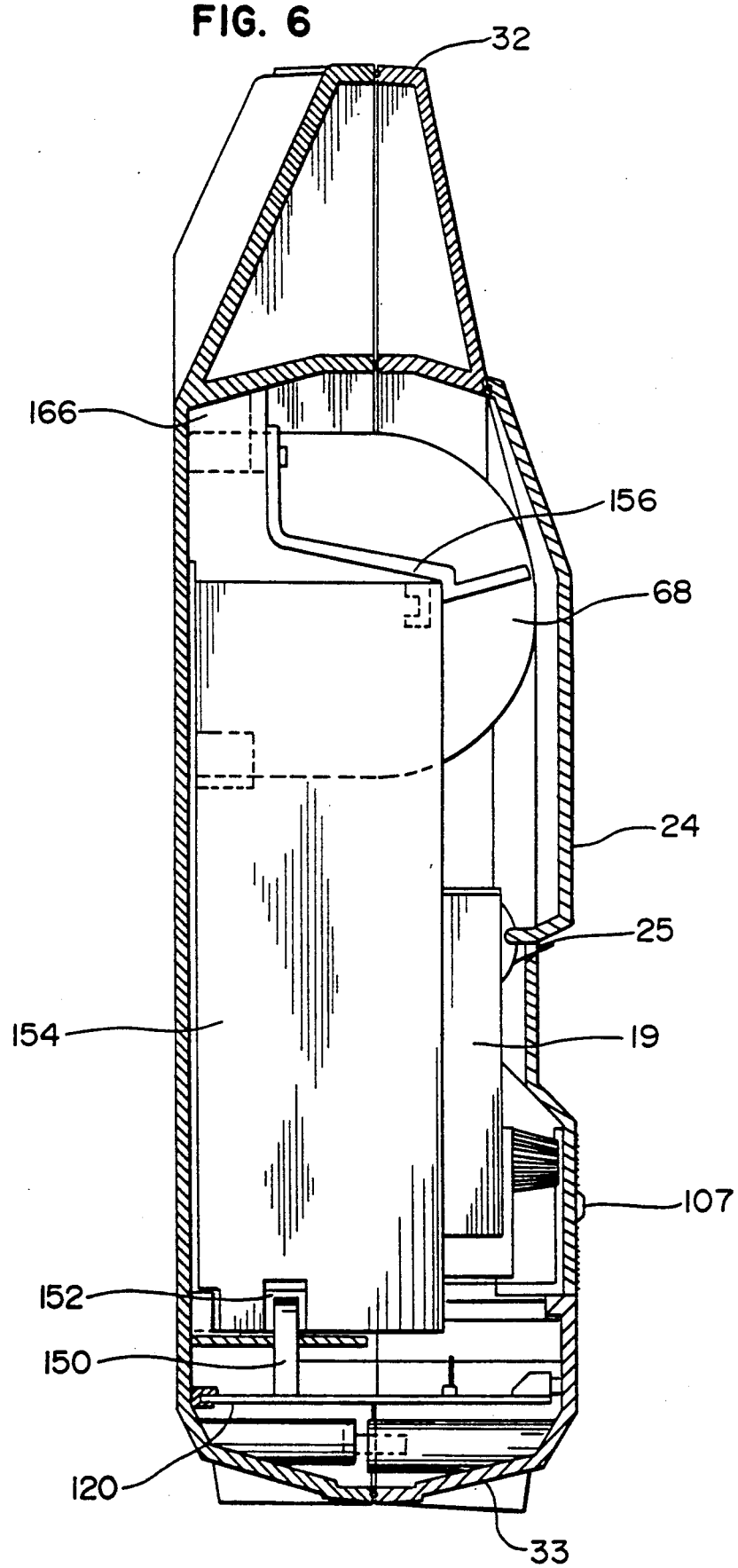
FIG. 6 is a sectional view of the printer cavity showing the location of a battery pack within the printer cavity.

In FIG. 6, the battery 154 is shown correctly inserted into the space between the guide walls 156 and 157, only the guide wall 156 being shown. A key-like protrusion 159 in the space and track between the guide walls allows the battery 154 to be placed forward into clamping engagement with the contact elements 150 and 151. If the battery 154 is inadvertently inverted with its upper end facing downward, the marker recess 158 is now replaced by the solid leading edge of the battery 154. In that the battery may accidentally be placed in front of the key-like protrusion 159 and accidentally reversed contacts of the battery 154 might engage the very ends of the contact elements 150 and 151, a latching lever 162 which typically fits over the rear of the battery 154 is used to prevent an operator from accidentally inserting the battery with such inadvertent reversal. The latching lever 162 is attached at one end to and extends from a mounting base 163. A second latching lever 164, also attached to the base 163, latches the paper holder 68 by a respective latching lug 165 into solid engagement with the base shell 17. The latching lug 165 is a ledge which protrudes from the exterior surface of the end wall 71, as best seen in FIG. 2. Because of the symmetry both halves of the paper holder 68 feature the mounting ledge or latching lug 165, though in the preferred embodiment the engagement of one of the lugs 165 by the latching lever establishes secure engagement. The mounting base 163 may be attached with typical, suitable threaded fasteners 166 to a respective mounting pedestal 167 disposed in the base housing shell 17.

A backstop 168 is molded into the upper printer housing shell 18. The backstop 168 is a wall which restricts the backward movement of the latching lever 162. The latching lever 162 can be pulled backwards away from the contacts 150 and 151 just far enough to provide space for the insertion of the battery 154 in front of the latching lever 162 only when the battery is in a fully forward position. The fully forward position is possible only when the battery is correctly oriented for proper contact with the respectively negative and positive contact elements 150 and 151.

Figure 7:
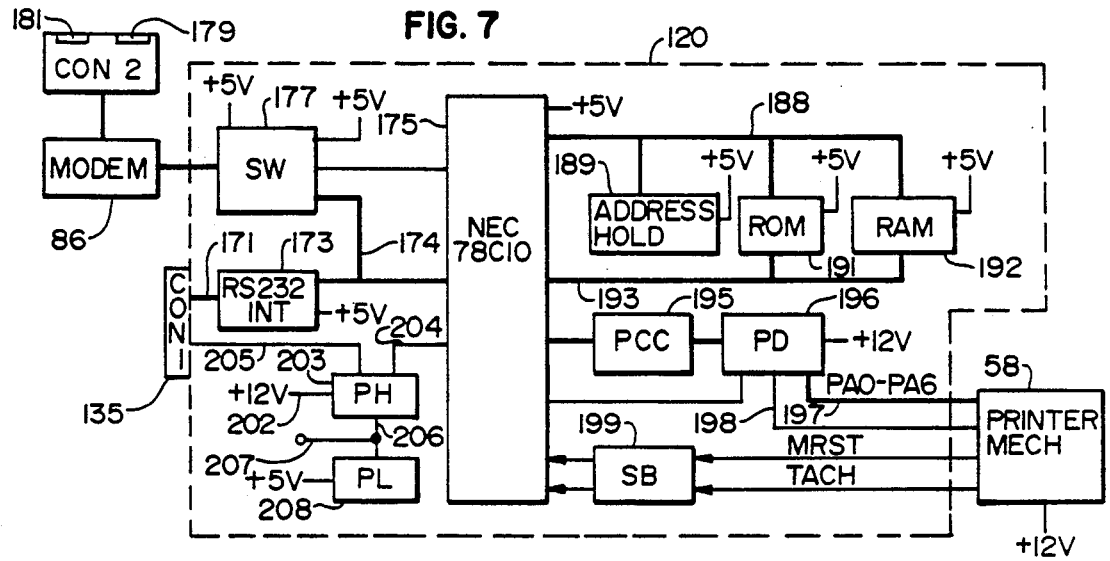
FIG. 7 is a schematic diagram showing functions of the portable printer device as described herein.
Figure 8:
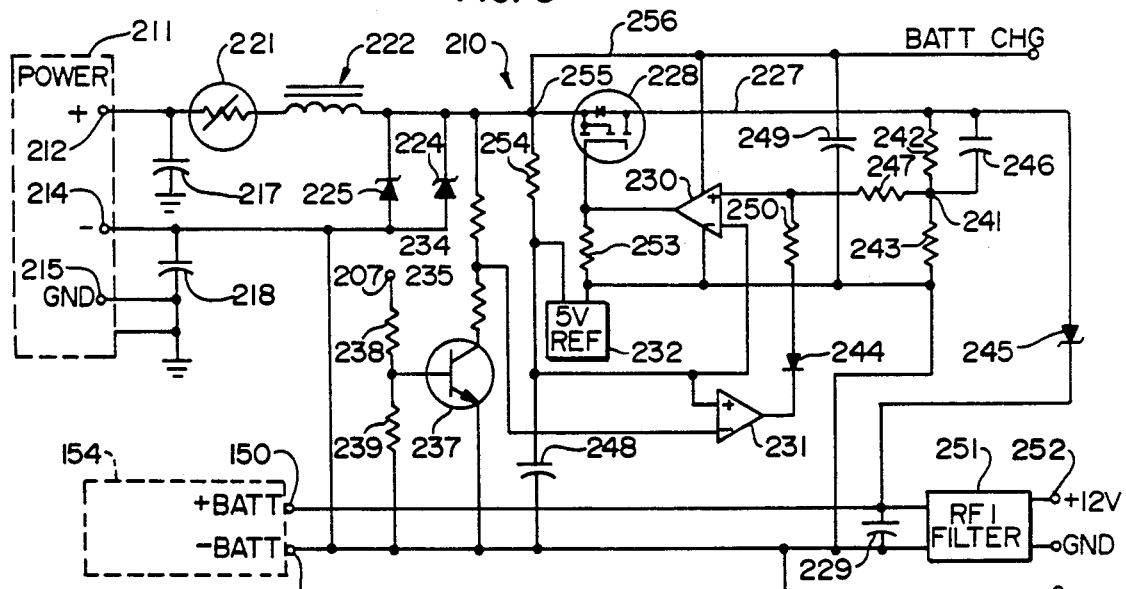
FIG. 8 is a schematic diagram of a regulator circuit particularly adapted for application of vehicle power to a printer assembly as further described herein.

FIG. 7 is a schematic diagram depicting major data communication functions supported by a preferred embodiment of the portable printer assembly 15 (shown in FIG. 1) described herein. Commercially available logic circuit elements and discrete electronic components may be used to implement supported functions. The majority of the function-implementing components are disposed on the described circuit board 120. In addition, power circuits which couple the battery via the terminals 150 and 151 or external power to the components, as shown schematically in FIG. 8, are preferably also disposed on the circuit board 120. The supported functions described with respect to FIG. 7 generally include printing of information as directed from the data entry terminal device. Communication between the data entry terminal device 40 (see FIG. 1) and the modem 86 may optionally be supported. The presence or absence of the modem 86 would generally not affect other features of the described invention.

Selected ones of the referred-to spring contacts 140 of the connector 135 identified in FIG. 7 by the connector function block "CON 1" carry data and control lines as data bus 171 for standard RS-232 data communication. The bus 171 couples "CON 1" to a communications interface 173. The interface is a typical buffer which converts the received signals and controls at ±12 volts in accordance with the RS-232 standard to typical 5 volt signal voltages as preferred for most on board logic, communication and control signals. A communication bus 174 routes signals from the interface 173 to a microprocessor 175. A preferred on-board microprocessor is an NEC 78C10 with low power consumption. The particular microprocessor also includes among other functions a voltage signal driven analog-to-digital converter which may be used to monitor power supply conditions, for example. The communications bus 174 is also coupled to a data switch 177 "SW" controlled by the microprocessor 175 via a direct control line. Standard RS-232 control signals may be used to instruct the microprocessor 175 whether printing or modem communication is desired. Standard control signals CTS (Clear To Send) and DSR (Data Set Ready) of the standard may be used to instruct the microprocessor 175, for example, via the CTS command that printing is desired, or via the DSR command that modem communication is desired by the data entry terminal 40. If the DSR signal is received, the data switch 177 is activated and modem communication is established via the connector 135 "CON 1" and the modem 86. The modem 86 is functionally a typical modem communicating data signals via a modem connector 178 ("CON 2").

Electrically, the modem connector 178 is a typical connector in accordance with FCC standards which includes dual outer telephone sockets 179 and 181, interconnected to allow connection of a carrier line and an external telephone (not shown) if so desired. Structurally, the modem connector 178 embodies a special feature in furtherance of the objects of the invention, and brief reference is made to FIG. 2. The connector 178 is a rectangular body which is disposed within an opening 182 of the base shell 17, and which seals the opening 182 when positioned within the base shell 17 and fastened in place, as, for example, by screw 183 extending centrally through the body of the connector 178 into the base shell 17. The size of the body of the connector 178 is symmetrical about the central mounting position of the screw 182. When the printer assembly 15 does not contemplate the use of the modem 86, the body of the connector may be rotated 180 degrees, as indicated by arrow 184 and may be fastened by the screw 183 such that an inner face 185 of the body of the connector 178 becomes disposed within the opening 182. This feature allows the connector 178 to be used at all times to close off and substantially seal the opening 182, either with the connector sockets 179 and 181 exposed, when the printer assembly contemplates the use of the modem 86, or facing inward when the use of a modem is not contemplated. In any event the opening 182 remains sealed and the connector 178 is available when the use of a modem becomes desirable at later time and field installation is required.

Referring again to FIG. 7, the microprocessor is contemplated to operate in a conventional manner. An address bus 188, typically an 8-line data bus, is coupled via an address hold circuit 189 to typical memory elements 191 and 192. Memory 191 may be a typical read only memory (ROM), while memory 192 represents typical random access memory (RAM), both of which being addressed and accessed in a conventional manner. The ROM memory 191 typically holds the microprocessor instructional protocol, which would typically include error trapping and error correction instructions, and which would typically include those particularly related to the desired operation of the printer mechanism, and may include those recommended by the manufacturer of the printer mechanism. A typical 8-line data bus 193 may be used to provide access by the microprocessor 175 to the memory locations defined by the memories 191 and 192 and as addressed via the address bus 188.

The printer mechanism 58 is controlled by the microprocessor 175 and driven through a print signal converter 195 ("PCC") by a printer driver 196 ("PD") in a typical manner as would be recommended by the manufacturer of the commercially available printer mechanism 58. For example, with respect to an EPSON 7-pin printer mechanism, ports PA0 through PA6 may provide printer solenoid address signals which are preferably gated with a timing signal, the length of the turn-on of the timing signal being dependent on the magnitude of the voltage applied to print head solenoids (not shown). The referred to analog to digital converter feature of the microprocessor may advantageously be used to control the length of the timing signal in response to the supply voltage as monitored by the microprocessor 175 in a conventional manner. The timing signal for determining the length of the power pulse applied to the print solenoids advantageously may be capacitively coupled to assure that a malfunction of the timing process does not result in a continuous power on signal causing damage to the print head. The print solenoid drive pulses and motor drive power are coupled via driver bus 197 and motor drive 198. Also, in accordance with the printer mechanism 58 referred to herein, two feedback signals are contemplated. A motor reset signal ("MRST") is returned from the printer mechanism 58 at the end of each sweep of the print head across the platen of the printer mechanism 58. A print solenoid indicator signal ("TACH") may be returned from the end of each print solenoid of the printer mechanism 58 to indicated the completion of a print cycle. The feedback signal on the state of the print solenoid operation controls delays between succeeding print cycles in that the period of a print cycle may vary with voltages and other factors, such as temperature or even the type of paper being printed. The printer mechanism 58, in contrast to other functions, is operated with 12- volt power. The printer driver functions as the interface between 5 volt logic signals and 12 volt drive signals. The feedback signals would typically be filtered as shown by the buffer function 199 ("SB"). The buffer 199 may also function as the 12 volt to 5 volt interface for the feedback signals before they are applied to the microprocessor 175. It should be understood that the above-described printer controls apply particularly to the referred to EPSON 7-pin printer mechanism. Other printers may require different controls, or other controls may be deemed desirable. Since other printers may be substituted for the printer described herein, it is understood that its respective mode of operation may be altered without departing from the spirit and scope of the invention.

The described printer mechanism and control function is preferably maintained in a normal power-down state to preserve power of the internal battery 154 (referred to in FIG. 8). Consequently, power to the described functions is generally supplied at a 12 volt supply line 202 (again in FIG. 7) as an input to a power hold circuit 203 ("PH"). The power hold circuit 203 is in essence a switch which is controlled by control signals 204 or 205. The control signal 205 may be provided as an initial power pulse applied by a direct voltage signal (CTS or DSR) such as from the data entry terminal device 40. The control signal 204 is a hold signal from the microprocessor 175 which causes the switch 203 to remain conductive during a printing operation, for example. The switched 12 volt power appears on a line 206 and at a terminal 207 before being converted to 5 volts by a low power voltage supply 208 ("PL").

Referring now to FIG. 8, a diagram of a power circuit designated generally by the numeral 210 is shown. A power connector socket 211 may also be referred to in FIG. 2. The connector socket 211 is a three-terminal socket for accessing external positive and negative power leads through terminals 212 and 214, respectively, and a vehicle-ground connection for noise and circuit protection through terminal 215. The accessed power leads are routed to the circuit board 120 through a connector plug 216 (see FIG. 5), and the following power components are preferably disposed on the circuit board 120 and power the operation of the already described functions. External power is desirable to allow the printer assembly 15 to be powered by typical 12 volt vehicle power systems. Such external power access would be desirable, for example, when the printer is used by a sales person taking orders from customers on a route accessed by motor vehicle. It may be desirable to recharge the internal battery 154 of the printer assembly 15 between stops at various customer locations. It may also be desirable to print information while the printer assembly 15 is being transferred between stops and is powered by such external vehicle power.

An inherent lack of voltage regulation of vehicle power, and a voltage sensitivity of commercially available print heads have resulted in printing problems when a printer is coupled into a vehicle-resident power system. In the past, problems caused by wide voltage variations in vehicle power sources have been resolved and print heads have been protected by blocking the printing function when the voltage falls below a certain voltage, say 11 volts, and when voltages rise above a certain second high limit, for example 13.5 volts. Voltages on vehicle power may range from 11 volts to almost 16 volts and in exceptional circumstances may be in excess of 25 volts. Regulating over a possible range of voltages, but of voltages which are unlikely to be seen is found to be wasteful and expensive. The power circuit 210 provides mid-range regulation without undue increase in complexity of a power circuit to permit use of the printer assembly 15 under vehicle power during normal vehicle operation.

Capacitors C1 and C2, 217 and 218, respectively, provide ESD protection to vehicle ground. A resettable overload protector 221 is placed in series with the positive power terminal 212. An inductor 222 may be preferred to filter out high frequency noise from the vehicle electrical system. Dual overvoltage shunts 224 and 225 may be preferred to cut in sequentially, such as at overvoltages of 18 and 25 volts respectively.

The external power is now selectively applied to a regulated branch or loop 227 through a switch 228, which in the preferred embodiment is a p-channel FET. A low voltage signal appearing at the gate terminal of the switch 228 renders the switch conductive and power is applied to the regulated loop 227 of the power circuit 210. Voltage changes in the regulated loop are filtered by a capacitor 229. Feedback for the control of the switch 228 is provided by differential amplifier circuits or comparators 230 and 231 which are referenced to a 5 volt standard reference source 232. The reference source 232 is applied to the non-inverting input of the amplifier 231 and to the inverting input of the amplifier 230. Resistors 234 and 235 are coupled between the non-regulated input and ground an provide at their node 236 an inverting input to the amplifier 231. The series-connected resistors 234 and 235 may be switched to ground through a transistor 237. Base current of the transistor 237 is controlled through limiting resistor 238 and the base of the transistor 237 is tied to ground through resistor 239. Base current to the transistor 237 is received from terminal 207 (see also FIG. 7). The non-inverting input to the amplifier 230 is coupled to a node 241 of resistors 242 and 243 which are series-coupled between the regulated loop 227 and ground. A diode 244 isolates a high output from the amplifier 231 to be applied to the non-inverting input of the amplifier 230, to allow its input voltage to be the variable derived from the node 241. Another isolation diode 245 prevents reverse current drain from the regulated loop and the battery 154 to low voltage unregulated external connections.

Other than the described major functional components, typical signal shaping elements may be applied. Other components, such as a capacitor 246 shunted across the resistor 242 or a resistor 247 coupled between the node 241 and the non-inverting input to the amplifier 230 have a signal shaping function. Other capacitors 248 and 249 similarly stabilize voltages. A resistor 250, coupled between the non-inverting input to the differential amplifier 230 and the output of the amplifier 231, functions as a bias resistor which may be used to establish a second, higher plateau of voltage regulation.

The regulated output from the described circuit 210 is preferably passed through an RFI filter 251 before the regulated voltage is applied to an output terminal 252. Further components, such as the resistor 253 between the gate of the switch 228 and ground, or the resistor 254 between the input voltage and the terminal to the 5 volt reference source 232 are bias and current limiting resistors, respectively.

Without a voltage signal appearing at the terminal 207, the base of the transistor 235 remains at ground and the transistor remains turned off. When an unregulated voltage is applied to an unregulated input node 255, the transistor 237 remains non-conductive. Consequently, the inverting input terminal to the amplifier 231 remains high with respect to the 5 volt reference voltage at its non-inverting input terminal. The non-inverting input terminal of the amplifier 230 is drawn low, again with respect to the 5 volt reference, and the low voltage applied to the gate of the switch 228 renders the switch continuously conductive and inhibits regulation. When the transistor 237 is rendered conductive it draws the inverting terminal of the amplifier 231 low with respect to the reference at the non-inverting terminal. The resulting high output now allows the non-inverting input terminal of the amplifier 230 to respond to the voltage at the node 241 between the resistors 242 and 243. The nominal voltage of 12 volts is in accordance with the present invention preferably regulated at approximately 13.3 volts. In accordance with known practices, choosing the resistors 242 and 243 with 8.25K ohms and 4.99K ohms, respectively, achieves such a value. It should, however, be understood that these values are given as a typical or preferred example only. Depending on the type of print mechanism to be used, these resistor values may be changed to vary the value of the nominally 12-volt voltage.

The absence of regulation when the microprocessor 175, and related logic and printer functions are rendered inactive, permit external power to be applied through the connector socket 211 to recharge the battery 154 with a charging voltage not further modified by the described regulation process. The unregulated external voltage input is therefore also identified as a battery charging input power line 256 ("BATT CHG"). The line 256 may be routed in conjunction with proper ground coupling, such as a ground line 257, via external power input contacts of the connector 135 to a data entry terminal device 40 when such device is inserted in the terminal holder 36 of the printer assembly 15. In this manner it may be possible to recharge battery 154 and a similar rechargeable battery of a respective data entry terminal device 40 from vehicle power, for example.

When the external power is applied from a vehicle having faulty power regulation, the external power may on occasion exceed 16 volts. To regulate the circuit to remain in the operating range of voltages in the unlikely event of such overvoltage would require components of greater precision and power handling capacity than desirable. It is consequently contemplated to shut down printing if under exceptional conditions the externally supplied power exceeds a certain voltage above the regulated voltage. The shutdown voltage may be chosen, for example, to be 16 volts. The resistor values are chosen such that the voltage at the inverting input of the amplifier 231 exceeds 5 volt when the unregulated voltage passes the desired upper voltage limit. The ground at the output of the amplifier 231 in turn switches the output of the amplifier 230. The amplifier 230 applies a low voltage to the gate of the switch 228 and regulation ceases. The already referred to function of the NEC 78C10 microprocessor 175 (see FIG. 7) senses a relatively sudden increase in the voltage as it rises above the previously regulated voltage of 13.3 volts and stops printing to prevent damage to the print mechanism 58. Upon reaching the point of non-regulation, the voltage in the loop 227 or output voltage from the transistor switch 228 would now track the external input voltage. Voltage tracking continues until the input voltage reaches an upper regulation voltage. At the upper regulation voltage, the voltage drop through the resistor 242 when added to the voltage drop through the resistor 247 equals 5 volts which is the same as the reference voltage. Any further increase in the input voltage then causes the output from the amplifier 230 to be high and the switch 228 would be turned off, thus clamping its output voltage at the upper regulation voltage.

Figure 9:
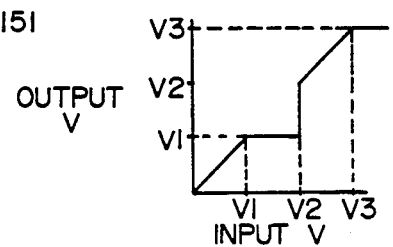
FIG. 9 is a graphic diagram of input and output voltages as contemplated in accordance with a preferred embodiment of the present invention.

Referring now to FIG. 9 a diagram represents the described voltage regulation functions with a control signal present at the terminal 207, such that the transistor 237 is turned on and the inverting input to the amplifier 231 proportionally follows the external input voltage. When a low voltage of less than the desired regulated voltage is applied via the external power connector 211 to the circuit board 120, the output voltage tracks the input voltage. The desired regulation voltage V1, which may be altered from the disclosed preferred voltage is the voltage at which the output from the amplifier 230 switches to a high output and the switch 228 momentarily turns off to begin regulation in the typical manner of a regulator of this type. Regulation of the external input voltage is maintained at the preferred regulated voltage V1 until the external input voltage reaches or exceeds V2. At V2, the voltage at the inverting input to the amplifier 231 exceeds that of the reference voltage, regulation now ceases and the voltage in the output loop climbs rapidly, damped by the capacitor 229 to the present unregulated value V2. The A/D converter port converts the rapidly changing voltage values to digital signals. The digital voltage signals are compared to a print mechanism cutoff voltage. During the sudden voltage rise from V1 to V2 the print mechanism cutoff voltage value is passed and printing is inhibited at the now higher voltage V2. Above the voltage V2, regulation is of little concern to the operation of the printer assembly 15, since the applied voltage is considered an out of tolerance voltage and printing is no longer possible. To continue printing, an operator would disconnect the printer assembly from the external power source. Thus, to avoid unnecessarily loading down the transistor switch 228, regulation may be desirably inhibited when the input voltage exceeds V2.

It has also been discovered that the described circuit 210 may be implemented as a two-step regulation circuit. The resistor 250 between the non-inverting input to the amplifier 230 and the isolation diode 244 may be chosen to establish a voltage divider voltage node between resistors 242, 247 and the resistor 259 to continue regulation across the switch 228 at a second high voltage input level V3. This may be desirable when sharing the power dissipation of regulation is contemplated between the switch 228 and the low power supply 208 shown in FIG. 7.

Having described the invention with respect to a particular embodiment thereof, it should be understood that various changes and modifications in the structure of the described embodiment are possible without departing from the spirit and scope of the invention as set forth in the claims.

What is claimed is:

1. A portable printer assembly comprising:
   a rigid generally rectangular housing having a generally rectangular contiguous peripheral edge, the housing comprising:
   a closed off generally rectangular printer cavity disposed within the peripheral edge of the housing;

a data entry terminal device cavity disposed at one side of the printer cavity and disposed within the peripheral edge of the housing, the terminal device cavity defining an open top channel for selectively receiving a data entry terminal device, said open top channel having a closed end co-terminal with the peripheral edge on a first side of the housing and having an open end co-terminal with the peripheral edge on a second opposite side of the housing;

a printer module mounted within the printer cavity of the housing; and a self-contained power source disposed within the printer cavity and electrically coupled to the printer module;

wherein a terminal receptacle is disposed in the closed end of the open top channel and electrically couples the printer module with a data entry terminal device when one end of the data entry terminal device is inserted into the closed end of the open top channel.

2. A portable printer assembly according to claim 1, wherein the closed end carries an upwardly directed resiliently yielding protrusion and downwardly directed retainer ledges disposed in the open top channel opposite the protrusion, whereby one end of the data entry terminal device is frictionally retained in the closed end by the resilient protrusion.

3. A portable printer assembly comprising:

a housing including a printer cavity, a data entry terminal device cavity and a handle portion, the handle portion being integrally formed within the outer confines of the housing;

a printer module mounted within the printer cavity of the housing;

a paper holder assembly mounted within the printer cavity of the housing and disposed adjacent said printer module, said paper holder assembly including means for supporting a supply of paper and for dispensing paper to said printer module, the printer cavity having a single, slotted opening for paper egress; and a self-contained power source disposed within the printer cavity and electrically coupled to the printer module;

wherein the paper holder assembly comprises two identical, oppositely disposed, facing paper support cups, each support cup having a circular end wall, a shaft disposed along a central axis perpendicular to the end wall towards the other of the two support cups, the shaft having a length to space the respective end wall of one of said cups from the end wall of the oppositely disposed support cup to rotatably support a roll of printer paper between the two respective end walls, support means for mounting the end cups with the respective shafts coaxially extending towards each other, and a cylindrical retainer shroud extending from the periphery of each respective end wall concentrically with and in the direction of each respective shaft, each shroud having a pair of paper slots in coplanar alignment with the respective paper slots of the opposite one of the two support cups, the printer cavity of the housing comprising means for removably mounting the paper support cups, the mounting means being spaced to engage the extending shafts in contiguous contact.

4. A portable printer assembly according to claim 3, wherein each support cup includes a ledge, and the printer assembly further comprises means mounted to the housing within the printer cavity for engaging at least one of ledges of the support cups for locking the paper support assembly in its mounted position to the housing.

5. A portable printer assembly comprising:

a housing;

a printer module mounted within the housing;

a paper holder assembly mounted within the housing wherein the paper holder assembly comprises two identical, oppositely disposed, facing paper support cups, each support cup having a circular end wall, a shaft disposed along a central axis perpendicular to the end wall towards the other of the two support cups, the shaft having a length to space the respective end wall of one of said cups from the end wall of the oppositely disposed support cup to rotatably support a roll of printer paper between the two respective end walls, support means for mounting the end cups with the respective shafts coaxially extending towards each other, and a cylindrical retainer shroud extending from the periphery of each respective end wall concentrically with and in the direction of each respective shaft, each shroud having a pair of paper slots in coplanar alignment with the respective paper slots of the opposite one of the two support cups, the printer cavity of the housing comprising means for removably mounting the paper support cups, the mounting means being spaced to engage the extending shafts in contiguous contact; and a self-contained power source disposed within the housing a electrically coupled to the printer module.

6. A portable printer assembly according to claim 5, wherein each support cup includes a ledge, and the printer assembly further comprises means mounted to the housing within the printer cavity for engaging at least one of ledges of the support cups for locking the paper support assembly in its mounted position to the housing.

* * * * *